No. 660,894. Patented Oct. 30, 1900.
V. H. ERNST.
OILING DEVICE.
(Application filed Sept. 27, 1898.)

(No Model.)

WITNESSES:
F.W. Wright
S. C. Connor

INVENTOR
VICTOR H. ERNST
BY
Howson and Howson
HIS ATTORNEYS.

UNITED STATES PATENT OFFICE.

VICTOR H. ERNST, OF JERSEY CITY, NEW JERSEY.

OILING DEVICE.

SPECIFICATION forming part of Letters Patent No. 660,894, dated October 30, 1900.

Application filed September 27, 1898. Serial No. 692,019. (No model.)

*To all whom it may concern:*

Be it known that I, VICTOR H. ERNST, a citizen of the United States, residing in Jersey City, county of Hudson, State of New Jersey, have invented an Improved Oiling Device, of which the following is a specification.

The object of my invention is to provide a simple device which will greatly aid in the efficient and economical oiling of journals and bearings by insuring the proper flow of oil from the oil-can into the bearing without waste or overflow and preventing the admission of grit and dirt through the oil-hole.

Figure 1:
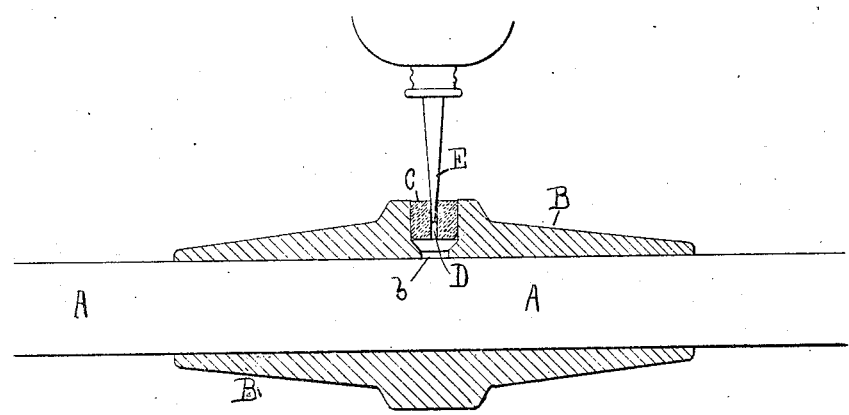
Figure 2:
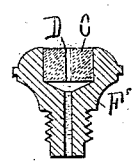
Figure 4:
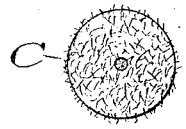
Figure 3:
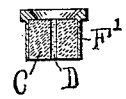

In the accompanying drawings, Figure 1 is a longitudinal section through a journal-box or bearing provided with my improvement. Fig. 2 is a sectional view showing the application of my invention to an oiling-cup, and Fig. 3 is a sectional view of a modification. Fig. 4 is an enlarged plan view of the plug of fibrous material removed from its holder.

The essential feature of my invention lies in the provision of a seal for the oiling-hole or oil-cup of a bearing, journal-box, or hub, this seal consisting of felt or other fibrous material adapted to close the oil-hole, but having an opening to receive and make a tight joint with the nozzle of the oil-can, as I will describe.

In Fig. 1, A indicates an axle or shaft which turns in or on which turns a journal-box, bearing, or hub B. In this part B is an oiling-opening b, which for the purpose of my invention may conveniently be enlarged for the reception of a plug C. This plug is of felt or other fibrous material. The enlargement of the oil-hole may be such that the inner end of the plug will be in contact with the axle or shaft; but I prefer to make the opening b cup-shaped, as shown, so that an oil-space is left between the inner face of the plug and the axle or shaft. This plug C has a small perforation or opening D through it adapted to receive and to make a tight joint with the nozzle E of an oil-can. In other words, when the nozzle of an oil-can is thrust into or against this opening D in the plug the latter forms a sort of stuffing-box between the oil-can nozzle and oil-hole, so that when the oil-can is, as usual, pressed to force the oil out of the can the oil is compelled to flow into or, in fact, is forcibly pumped into the bearing, where it is required, since the oil cannot escape in any other direction.

The plug described, especially when made of felt, has the additional advantage of offering many hairs or fibers in the opening to prevent the admission of grit and dirt to the journal or bearing.

In Fig. 2 I have shown my invention as applied to a simple form of oil-cup F, threaded to be screwed into a correspondingly-threaded oiling-opening in a bearing or hub.

In Fig. 3 the plug C is shown as mounted in a metal ferrule F', in which form it can be conveniently marketed for application to existing oiling holes or cups.

I claim as my invention—

1. The combination with a bearing having an oiling-hole therein, of a seal for said hole, consisting of a plug of fibrous material adapted to close the oil-hole, said plug having an opening of such diameter as, first, to make a tight joint with the nozzle of an oil-can when the latter is inserted for oiling, and, second, to permit the fibers to screen the opening when the nozzle is withdrawn, whereby waste of oil is prevented, and dust or grit excluded from the bearing, substantially as described.

2. The combination with a bearing having an oil-hole therein, of a seal for said oil-hole, consisting of a plug of felt adapted to close the oil-hole and having an opening of such diameter, as, first, to make a tight joint with the nozzle of an oil-can when inserted therein, and, second, to permit the fibers to screen the opening when the nozzle is withdrawn, whereby waste of oil is prevented, and dust or grit excluded from the bearing, substantially as described.

3. The combination of a bearing or hub having an opening over and about the oil-hole, with a fibrous plug fitted into said opening, said plug being itself provided with an opening of such diameter, as, first, to make a tight joint with the nozzle of an oil-can when inserted therein, and, second, to permit the fibers to screen the opening when the nozzle is withdrawn, whereby waste of oil is prevented, and dust or grit excluded from the bearing.

In testimony whereof I have signed my name to this specification in the presence of two subscribing witnesses.

VICTOR H. ERNST.

Witnesses:
GEORGE E. MINER,
HUBERT HOWSON.